United States Patent [19]

Lohmar et al.

[11] 4,442,233

[45] Apr. 10, 1984

[54] METHOD FOR THE MANUFACTURE OF CROSS-LINKED AND OPTIONALLY FOAMED POLYPROPYLENE

[75] Inventors: Ernst Lohmar, Weinheim; Wolffried Wenneis, Mannheim, both of Fed. Rep. of Germany

[73] Assignee: Firma Carl Freudenberg, Weinheim, Fed. Rep. of Germany

[21] Appl. No.: 389,559

[22] Filed: Jun. 17, 1982

Related U.S. Application Data

[63] Continuation of Ser. No. 77,909, Sep. 24, 1979, abandoned.

[30] Foreign Application Priority Data

Sep. 13, 1978 [DE] Fed. Rep. of Germany ....... 2939733

[51] Int. Cl.$^3$ .............................................. C08J 9/04
[52] U.S. Cl. ....................................... 521/98; 264/22; 521/79; 521/81; 521/134; 521/140; 524/490; 524/491; 525/232; 525/313
[58] Field of Search ................ 525/313, 232; 521/134, 521/140, 98, 79, 81; 524/490, 491; 264/22

[56] References Cited

U.S. PATENT DOCUMENTS

| | | | |
|---|---|---|---|
| 2,834,751 | 5/1958 | Jones | 260/45.5 |
| 3,240,727 | 3/1966 | Scaleri et al. | 521/140 |
| 3,407,253 | 10/1968 | Yoshimura et al. | 521/140 |
| 3,522,198 | 7/1970 | Yamada et al. | 524/490 |
| 3,696,059 | 10/1972 | Hosoda et al. | 521/140 |
| 3,709,806 | 1/1973 | Minami et al. | 521/140 |
| 3,939,237 | 2/1976 | Naito et al. | 521/140 |
| 3,981,830 | 9/1976 | Takeuchi et al. | 521/140 |
| 4,142,956 | 3/1979 | Shikinami et al. | 521/140 |
| 4,166,890 | 9/1979 | Fried et al. | 521/140 |

FOREIGN PATENT DOCUMENTS 1212724  3/1966  Fed. Rep. of Germany.

OTHER PUBLICATIONS

Encyclopedia of Poly. Sci., vol. 9, p. 183.
Kuntstoff-Handbuch, vol. 1, p. 401–(1975).

*Primary Examiner*—Morton Foelak
*Attorney, Agent, or Firm*—Kenyon & Kenyon

[57] ABSTRACT

Disclosed herein is a process for producing cross-linked polypropylene by subjecting a homogenous mixture of a polypropylene with from about 2 to about 20 weight percent, based upon the weight of the polypropylene, of polybutadiene with a molecular weight of from about 500 to about 10,000 to conditions sufficient to effect cross-linking, for example, through the use of cross-linking agents and/or irradiation. In addition, the process disclosed herein may be utilized to produce cross-linked and foamed polypropylenes.

19 Claims, No Drawings

METHOD FOR THE MANUFACTURE OF CROSS-LINKED AND OPTIONALLY FOAMED POLYPROPYLENE

This is a continuation of application Ser. No. 77,909 filed Sept. 24, 1979, now abandoned.

It is known that polyolefins can be cross-linked with peroxides and/or high-energy radiation, and that they can be simultaneously or subsequently formed into foams with chemical foaming agents such as azodicarbonamide, sulfonyl hydrazine, sulfonyl semicarbazidene and the like. However, combined cross-linking and foaming procedures are of only limited applicability. They are well suited for foaming both low-pressure and high-pressure polyethylenes, but highly crystalline low-pressure polypropylenes and high-pressure polypropylenes present great difficulties because of the high temperature required for processing these polypropylenes. Thus, during the compounding of polypropylene with peroxides and the foaming agents, a reaction sets in prematurely, and the compound foams up while it is being cross-linked.

Even in the absence of foaming agents, polypropylenes cannot always be cross-linked without difficulty by means of customary cross-linking agents such as peroxides. For example, while it may be possible to obtain cross-linked polypropylene products with large amounts of peroxide, the resulting cross-linked products are brittle, fragile and unsuitable for practical applications.

It also has been attempted to cross-link polypropylenes by using high-energy radiation; however, such extremely high dose rates are required that this method is not economical.

Because of the high temperature stability and the mechanical resistance of the polypropylenes, which is greater than that of the polyethylenes, there is a need for an economical method for the manufacture of polypropylene foams, especially of polypropylenes with low bulk density of about 30 to about 200 kg/m$^3$. In manufacturing such foams it is necessary to cross-link the polypropylene first in order to obtain sufficiently high viscosity or toughness necessary for foaming the material and to prevent the cells of the foam formed from collapsing. Light foams cannot be manufactured by conventional means without prior or simultaneous cross-linking of the material.

It is an object of this invention to provide a method for producing cross-linked polypropylene.

It is a further object of this invention to provide a method for producing cross-linked and foamed polypropylenes.

Still another object of this invention is the provision of a method for producing cross-linked, foamed polypropylenes wherein the polypropylenes are given the requisite high viscosity during foaming to provide uniform cell structure after foaming. Such foamed polypropylenes have good heat insulating properties as well as watertightness, chemical resistance and weatherproofness.

These, and other objects of the invention, which will be apparent from the ensuing specification and claims, are achieved by a process comprising the steps of:

(1) Preparing a homogenous mixture of a polypropylene with from about 2 to about 20 weight percent, based upon the weight of the polypropylene, of polybutadiene with a molecular weight of from about 500 to about 10,000; and (2) Subjecting the resulting mixture to conditions sufficient to effect cross-linking.

Optionally, and in a preferred embodiment, the mixture of polypropylene and polybutadiene is subjected to conditions sufficient to foam the mixture. Where chemical cross-linking agents or chemical foaming agents are incorporated into the mixture, the mixture formed in step (1) is prepared at a temperature below the decomposition temperature of the cross-linking and/or the foaming agents.

The polybutadienes employed in accordance with this invention are those having a 1,2-vinylpolybutadiene content of at least 35 percent, and preferably of from about 85 to about 90 percent. Particularly preferred polybutadienes are those with a molecular weight of from about 1,000 to about 3,000, i.e. normally liquid polybutadienes. Normally solid polybutadienes, especially those having molecular weights of about 20,000 or higher, are considerably less useful. This is because the use of a liquid polybutadiene allows the blending in of other additives, such as cross-linking or foaming agent, without premature cross-linking or foaming during the mixing process.

The method according to the invention allows the compounding of the polypropylene to be cross-linked and optionally foamed to be effected at temperatures of from about 160° to about 180° C. Prior to this invention, the compounding had to be performed at substantially higher temperatures of about 240° C., where a more or less pronounced reaction with cross-linking and/or foaming agents will occur. It is advantageous that, with the method according to the invention, the required energy for compounding, for instance in an extruder, is from about 30 to about 50 percent less than the energy required for compounding polypropylene mixtures which contain only peroxides and/or foaming agents.

Furthermore, the use of polybutadiene in admixture with polypropylene reduces the amount of high-energy radiation required to achieve cross-linking. Thus, in cross-linking polypropylene with high-energy radiation, dose rates of about 5 to 10 Mrad are sufficient to obtain a gel content of about 70% in accordance with the procedure according to this invention. If mixtures without polybutadiene are used, then a dose of more than 20 Mrad is necessary to achieve cross-linking, and even then the degree of cross-linking of comparable polypropylene batches is lower than that achieved in accordance with this invention.

The method of this invention is particularly suitable for the manufacture of light polypropylene foams with a density of from about 30 to about 200 kg/m$^3$, starting preferably from a homogenous mixture which contains from about 5 to about 10 weight percent, based upon the weight of the polypropylene, of polybutadiene. In processing, the polybutadiene acts as a plasticizer, and the low processing temperature (about 170° C.±10° C.) and the softener action of the polybutadiene save substantial amounts of energy.

It is possible to carry out simultaneously effective cross-linking with peroxides and/or high-energy radiation. For example, a matrix of polypropylene with a cross-linking agent, e.g., a peroxide, and with a foaming agent, e.g., with azodicarbonamide, can be prepared which can be cross-linked as well as freely expanded, and thus furnishes a valuable light-weight foam material. In addition, according to this invention, polypropylene mixtures can be produced and processed which can be cross-linked with electron beams and/or peroxides and can then be processed further into foams. While the process of this invention is especially useful for manufacturing foamed polypropylenes, it is also suitable for the manufacture of only cross-linked polypropylenes. Mechanically tough, chemically and thermally resistant polypropylenes can thus be manufactured in the described economical manner.

A particularly advantageous embodiment of the method according to this invention is the manufacture of continuous webs or panels of foam material of polypropylene, without applying pressure or molds. To this end, the polypropylene mixture is formed into a continuous sheet by means of an extruder prior to the cross-linking and, if employed, foaming, and the thus-formed sheet is then heated on both sides essentially uniformly and directly on a gas-permeable endless conveyor belt (for instance, of wire fabric) for cross-linking and, optionally, foaming. The formed sheet is preferably subject to a cross-linking electron beam treatment prior to the heating. The heating on the conveyor belt is accomplished in one or more stages in an oven with a temperature of from about 200° to about 300° C. It is advisable to add a foaming agent, the decomposition temperature of which is higher than the decomposition temperature of the cross-linking agent.

When the web or the panel is heated on the conveyor belt of wire fabric or other suitable gas-permeable support, the web or panel can be heated nearly uniformly on the upper as well as on the lower side. The heating should be carried out rapidly in order to prevent the mixture from becoming sticky, so that the web or panel retains its shape and expands uniformly in all directions. After leaving the oven, the web or panel can be lifted off the conveyor belt or the support device without difficulty.

Preferred cross-linking agents are organic peroxides known to be effective as cross-linking agents for polypropylene, and especially dicumyl peroxide, dibutyl peroxide, cumylhydroperoxide, and α,α'-bis(t-butyl-peroxy) di-isopropyl benzene.

Suitable chemical foaming agents likewise are those known per se, for use in foaming polyolefins, and in particular azodicarbonamide, sulfonyl hydrazine, sulfonyl semicarbazide and the like are useful. It is essential, however, that the foaming agent used have a decomposition temperature which is equal to or higher than that of the cross-linking agent, for instance, the organic peroxide. If the decomposition of the foaming agent is lower than that of the cross-linking agent, then no cross-linking is produced prior to the foaming, so that the foam material collapses and often also sticks to its substrate. The decomposition of the foaming agent is preferably about 20° C. higher than that of the cross-linking agent.

In the preparation of the polypropylene mixture, customary additives can be admixed. Illustrative additives include antioxidants, pigments, flame-retardants, antistatic agents, lubricants, softeners and the like.

The invention will now be explained further with the aid of the following examples, which are intended to illustrate but not to limit the present invention.

EXAMPLE 1

A mixture consisting of 85 parts by weight low-pressure polypropylene (melt index 230/5 g/10 min=10) and 15 parts by weight azodicarbonamide was homogenized in a fluid mixer and compounded in a twin screw extruder with 5 parts by weight polybutadiene (molecular weight 3,000, 1,2-content 90%) and formed into a continuous web at 170° to 180° C. by means of an extruder. The web was irradiated with an electron beam at a dose of 8 Mrad to crosslink the web. The cross-linked web was deposited on a conveyor belt of wire screen, and then run into a recirculating-air oven where the upper and lower surfaces of the web were heated simultaneously for 8 minutes to 210° C. and the web was foamed. The thus-produced foam material sheet had uniform, fine cells, an internal structure without defects, and a density of 35 kg/m$^3$. The gel content of the polypropylene, as determined in boiling xylol, was 69 percent.

EXAMPLES 2-6

Influence of Radiation Dose on Cross-linking

Employing materials, equipment and procedures similar to those described in Example 1 (85 parts by weight polypropylene and 15 parts by weight azodicarbonamide), a series of experiments was conducted to illustrate the influence of radiation dose on cross-linking. The data for these experiments are summarized in Table I below, and shows that satisfactory cross-linking took place at as low as 6 Mrad as well as with 8 and 10 Mrad doses.

TABLE I

| Example | Polypropylene,* Parts By Weight | Azodicarbonamide, Parts By Weight | Polybutadiene, Parts By Weight | Radiation Dose, Mrad | Bulk Density kg/m$^3$ | Gel Content, Percent |
|---|---|---|---|---|---|---|
| 2 | 90 | 10 | 5 | 6 | 45 | 56 |
| 3 | 90 | 10 | 5 | 8 | 50 | 71 |
| 4 | 90 | 10 | 5 | 10 | 50 | 73 |
| 6 | 90 | 10 | 5 | 12 | ** | 80 |

*Melt Index 230/5:10 g/10 min.
**Over-cross-linked: foam cracked.

EXAMPLES 7-31

Influence of the Amount of Polybutadiene on Cross-Linking

Employing materials, equipment and procedures similar to those described in Example 1, employing 85 parts by weight of polypropylene and 15 parts by weight of azodicarbonamide, a series of experiments was conducted to illustrate the effect of the amount of polybutadiene (M.W. 3000) on cross-linking. The data for these experiments are summarized in Table II below:

TABLE II

| Example | Polybutadiene, Parts By Weight, Per 100 Parts Polypropylene | Radiation Dose, Mrad | Gel Content, Percent | Bulk Density, kg/m³ |
|---|---|---|---|---|
| 7 | 4.5 | 4 | 0.7 | — |
| 8 | 4.5 | 6 | 43 | Foam collapsed on expanding. |
| 9 | " | 8 | 54 | 37 |
| 10 | " | 10 | 62 | 44 |
| 11 | " | 12 | 62 | 44 |
| 12 | 6 | 4 | 1.3 | — |
| 13 | " | 6 | 51 | Foam stuck in expanding process. |
| 14 | " | 8 | 62 | 38 |
| 15 | " | 10 | 65 | Foam unacceptable. |
| 16 | " | 12 | 70 | Foam unacceptable. |
| 17 | 7.5 | 4 | 1.2 | Foam collapsed on expanding. |
| 18 | " | 6 | 53 | 40 |
| 19 | " | 8 | 71 | 38 |
| 20 | " | 10 | 72 | 35 |
| 21 | " | 12 | 74 | Foam unacceptable. |
| 22 | 9 | 4 | 2.2 | — |
| 23 | " | 6 | — | 40 |
| 24 | " | 8 | 65 | 45 |
| 25 | " | 10 | 73 | 40 |
| 26 | " | 12 | 71 | Foam unacceptable. |
| 27 | 10 | 4 | 0.4 | Foam collapsed on expanding. |
| 28 | " | 6 | 71 | 42 |
| 29 | " | 8 | 70 | 38 |
| 30 | " | 10 | 78 | Foam unacceptable. |
| 31 | " | 12 | 78 | Foam unacceptable. |

As demonstrated in these Examples, mixtures containing higher contents of polybutadiene generally require lower radiation doses to obtain cross-linking. Thus, using 10 parts by weight polybutadiene, a gel content of 71% and an acceptable foam can be obtained using only a radiation dose of 6 Mrad (Example 28), while the same dose results in a gel content of 43% and a collapsed foam in a mixture containing 4.5 parts by weight polybutadiene (Example 8). However, where the radiation dose for this latter mixture is increased to 8 Mrad (Example 9), a foam is obtained.

EXAMPLES 32–34

Influence of the Type of Polybutadiene on Cross-linking

A second series of experiments was performed to illustrate the effect of the type of polybutadiene on cross-linking by using polybutadiene having a molecular weight of 2,000. The data for these experiments are summarized in Table III, and demonstrates that the use of a lower molecular weight polybutadiene does not exert any negative influence on the foam production.

TABLE III

| Example | Parts of Polybutadiene Per 100 Parts Polypropylene | Radiation Dose, Mrad | Gel Content, Percent | Bulk Density, kg/m³ |
|---|---|---|---|---|
| 32 | 10 | 6 | 34 | 40 |
| 33 | " | 8 | 74 | " |
| 34 | " | 10 | 76 | " |

EXAMPLES 35–37

Influence of Amount of Foaming Agent on Foam Density

Employing materials, equipment and procedures similar to those described in Example 1, a series of experiments was conducted to illustrate the effect of the amount of foaming agent. The data for these experiments are summarized in Table IV and demonstrates that the higher the amount of azodicarbonamide, the lighter the foam produced.

TABLE IV

| Example | Polypropylene Parts By Weight | Azodicarbonamide, Parts By Weight | Polybutadiene, Parts By Weight | Radiation Dose Mrad | Bulk Density, kg/m³ |
|---|---|---|---|---|---|
| 35 | 100 | 5 | 6 | 8 | 100 |
| 36 | 90 | 10 | " | " | 45 |
| 37 | 85 | 15 | " | " | 30 |

EXAMPLES 38–52

Influence of Polypropylene Melt Viscosity on the Foam and Cross-linking

Employing materials, equipment and procedures similar to those described in Example 1, except that polypropylenes of varying melt viscosities were employed, a series of experiments was conducted with mixtures containing 85 parts by weight polypropylene, 15 parts by weight azodicarbonamide and 8.5 parts by weight polybutadiene, to illustrate the influence of the melt viscosity of the polypropylene. The data for these experiments is summarized in Table V and demonstrates that the most advantageous results with respect to foam production are achieved utilizing polypropylenes having a melt viscosity of 30 g/10 min (MFI 230/5) and lower.

TABLE V

| Example | Polypropylene Melt Viscosity, MI 230/5 | Radiation Dose, Mrad | Gel Content (xylol), Percent | Bulk Density, kg/m³ |
|---|---|---|---|---|
| 38 | 60 | 4 | 37 | No foam produced. |
| 39 | " | 6 | 68 | Foam stuck in expansion process. |
| 40 | " | 8 | 75 | Foam stuck in expansion process. |
| 41 | " | 10 | 74 | No foam produced. |
| 42 | " | 12 | 78 | No foam produced. |
| 43 | 30 | 4 | 0.8 | No foam produced. |
| 44 | " | 6 | 65 | Foam stuck in expansion process. |
| 45 | " | 8 | 72 | 38 |
| 46 | " | 10 | 73 | Foam unacceptable. |
| 47 | " | 12 | 74 | Foam unacceptable. |
| 48 | 12 | 4 | 76 | Foam stuck in expansion process. |
| 49 | " | 6 | 82 | 33 |
| 50 | " | 8 | 80 | Foam unacceptable. |
| 51 | " | 10 | 80 | Foam unacceptable. |
| 52 | " | 12 | 81 | Foam unacceptable. |

EXAMPLE 53

A mixture consisting of 85 parts by weight low-pressure polypropylene (melt index 230/5/10 min.=10), 15 parts by weight azodicarbonamide and 2 parts by weight α,α'-bis(t-butylperoxy)di-isopropylbenzene was homogenized in a fluid mixer and then compounded in a twin screw extruder with 7 parts by weight polybutadiene (molecular weight 3,000, 1,2-vinyl content of 90%). The resulting mixture was formed into a continuous web by means of an extruder at 170° to 180° C. The web was cross-linked and foamed on a wire screen conveyor belt by heating at 210° C. for 8 minutes in a recirculated air oven. The polypropylene foam thus obtained had a density of 30 kg/m³, and a gel content of 70%, as determined in boiling benzene.

EXAMPLES 54–58

The method of Example 53 was repeated, with varying amounts of peroxide (α,α'-bis)t-butylperoxy(di-isopropyl benzene), azodicarbonamide and polybutadiene. The data are summarized in Table VI.

TABLE VI

| Example | Polypropylene, Parts By Weight | Peroxide, Parts By Weight | Azodicarbonamide, Parts By Weight | Polybutadiene, Parts By Weight | Bulk Density kg/m³ | Gel Content, Percent |
|---|---|---|---|---|---|---|
| 54 | 100 | 1 | 5 | 2 | — | 9.3 |
| 55 | 100 | 1 | 5 | 4 | 100 | 40.8 |
| 56 | 100 | 1 | 5 | 8 | 100 | 71.0 |
| 57 | 100 | 1 | — | 8 | — | — |
| 58 | 100 | 1.1 | 11 | 8 | 54 | — |

The polypropylenes employed in accordance with this invention preferably have a melt viscosity in the range of about 5 to 10 g/10 min. (MFI 230/5). As can be seen from the preceding Examples, the higher the melt viscosity of the polypropylene utilized, the easier the foam sticks to the base during the expansion process (Examples 38–42). The lower the melt viscosity, the more difficult becomes the production of the matrix; however, where polypropylenes of low viscosity are utilized, lower doses of radiation are required to obtain an adequate cross-linked foam (Examples 48–52). In addition, when peroxides are utilized as cross-linking agents, the melt viscosity of the polypropylene should be as high as possible, e.g., in the range of from about 20 to 60 g/10 min. (MFI 230/5).

What is claimed is:

1. In a method for producing cross-linked crystalline high pressure or low pressure polypropylene by subjecting said polypropylene to high energy radiation and/or heating a mixture of said polypropylene with a peroxide cross-linking agent, the improvement comprising mixing said polypropylene with from about 2 to about 20 weight percent, based upon the weight of said polypropylene of, a normally liquid polybutadiene, and a foaming agent compounding said mixture at a temperature of about 160° C. to about 180° C.; and thereafter subjecting said compounded mixture to conditions sufficient to cross-link said polypropylene and foam said mixture.

2. A method according to claim 1 wherein the amount of polybutadiene is from about 5 to about 10 weight percent based upon said polypropylene.

3. A method according to claim 1 wherein said polybutadiene has a 1,2-vinylpolybutadiene content of at least 35 percent.

4. A method according to claim 1 wherein said polybutadiene has a 1,2-vinylpolybutadiene content of from about 85 to about 90 percent.

5. A method according to claim 1, wherein cross-linking is effected by irradiation of said mixture at a dose rate of from about 2 to about 20 Mrad.

6. A method according to claim 5, wherein said dose is from about 6 to about 10 Mrad.

7. A method according to claim 1 wherein cross-linking is effected by admixing said mixture of polypropylene and polybutadiene with an organic peroxide cross-linking agent and heating the resulting mixture at a temperature greater than the decomposition temperature of said peroxide.

8. A method according to claim 7 wherein polypropylene, polybutadiene and organic cross-linking agent are mixed at a temperature below the decomposition temperature of the cross-linking agent.

9. A method according to claim 1 wherein polypropylene, polybutadiene and a foaming agent are mixed at a temperature below the decomposition of the foaming agent, thereafter subjecting the resulting mixture to conditions sufficient to cross-link said polypropylene.

10. A method according to claim 9 wherein the amount of polybutadiene is from about 5 to about 10 weight percent based upon said polypropylene.

11. A method according to claim 9 wherein said polybutadiene has a 1,2-vinylpolybutadiene content of at least 35 percent.

12. A method according to claim 9 wherein said polybutadiene has a 1,2-vinylpolybutadiene content of from about 85 to about 90 percent.

13. A method according to claim 9 wherein cross-linking is effected by irradiation of said mixture at a dose rate of from about 2 to about 20 Mrad.

14. A method according to claim 13, wherein said dose is from about 6 to about 10 Mrad.

15. A method according to claim 9 wherein cross-linking is effected by admixing said mixture of polypropylene and polybutadiene with an organic peroxide polypropylene cross-linking agent and heating the resulting mixture at a temperature greater than the decomposition temperature of said peroxide.

16. A method according to claim 7 wherein polypropylene, polybutadiene, an organic cross-linking agent and a foaming agent are mixed at a temperature below the decomposition temperatures of the cross-linking agent and the foaming agent.

17. A method according to claim 16, wherein the decomposition temperature of the foaming agent is higher than that of the cross-linking agent.

18. A method according to claim 7 wherein said mixture is compounded by extrusion.

19. A method according to claim 1 wherein said mixture of said polypropylene, polybutadiene and organic cross-linking agent is compounded by extrusion.

* * * * *